Nov. 17, 1970    T. O. PAINE, ACTING    3,541,450
ADMINISTRATOR OF THE NATIONAL AERONAUTICS
AND SPACE ADMINISTRATION
TEMPERATURE TELEMETRIC TRANSMITTER
Filed Jan. 30, 1969

INVENTOR.
ROYAL G. HARRISON

BY *Monte F. Mott*
      *J. Hm & Cay*
ATTORNEYS

United States Patent Office 3,541,450
Patented Nov. 17, 1970

3,541,450
TEMPERATURE TELEMETRIC TRANSMITTER
T. O. Paine, Acting Administrator of the National Aeronautics and Space Administration, with respect to an invention of Royal G. Harrison, La Canada, Calif.
Filed Jan. 30, 1969, Ser. No. 795,182
Int. Cl. H04b 1/02
U.S. Cl. 325—113            9 Claims

ABSTRACT OF THE DISCLOSURE

A temperature telemetric transmitter is disclosed for short range transmission comprising a resonant feedback oscillator having a frequency determining tank circuit in which a spiral-wound, printed-circuit inductor functions as an antenna. At least one voltage-variable capacitor is included in a branch parallel to the inductor. A thermistor connected in series with a resistor provides a bias that varies as the function of temperature for the voltage-variable capacitor to vary the frequency of the oscillator accordingly. For heat transfer investigation of a given material the thermistor is deposited as a very thin film on a substrate of the material under investigation and thermally insulated except from the substrate. For fast calorimetric response to small changes in environmental temperature, the substrate is also provided as a thin film.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to calorimetric and temperature telemetric transmitters, and more particularly to an oscillator which changes frequency in proportion to changes in temperature of a thermistor and itself transmits an electromagnetic wave at its own frequency over a short range.

Temperature telemetering has generally been accomplished by modulating a carrier frequency of the transmitter. A signal proportional to the temperature of the environment being monitored is first developed and then applied to a modulating circuit which receives a carrier frequency from a very stable local oscillator. While such telemetric systems are very satisfactory and widely used, in some applications it is desirable to have a much smaller, highly sensitive telemetric transmitter for use in monitoring the temperature of environments at relative close range such as in industrial processing plants, research laboratories and hospitals. For example, in an intensive-care ward for premature infants, it may be desirable to monitor the temperature of a plurality of incubators. A small sensitive telemetric transmitter could be placed in each incubator and tuned for transmission of a signal at a predetermined frequency for the desired temperature. A change in frequency from any one of the transmitters beyond tolerable limits could then be detected by a centrally located receiver which would sound an alarm to alert an attendant to conduct a visual check of the temperature being maintained in each incubator.

A similar system could be employed in an industrial plant to monitor a plurality of different temperatures which are to be maintained substantially constant. Each telemetric transmitter would be adjusted to transmit the same frequency for the desired temperature of the station to which it is assigned. If it is desirable to know immediately which station is no longer on temperature, the various telemetric transmitters could be adjusted to transmit at different frequencies. A plurality of receivers, each tuned for reception of a signal of a particular transmitter, could then be employed at a central station to detect which of the various telemetric transmitters has deviated from assigned frequency.

Many other applications for a small sensitive telemetric transmitter will immediately occur to those skilled in different fields, such as monitoring body temperatures in medical research with active animals, and studies of particular models in a wind tunnel. On occasion, it may be desirable to monitor heat transfer through a given material in response to small changes in environmental temperatures. For example, it may be desirable to conduct heat transfer studies of materials in the wake of a projectile in a wind tunnel. Since wind tunnels are necessarily short, high flow velocities provide short free flight periods of the projectile. Therefore, a calorimetric telemetric transmitter of extreme sensitivity and fast heat transfer response is required.

In all of these applications, there is a requirement for a very small, light weight sensor and transmitter. In the past telemetric transmitters have employed a separate antenna system consisting of, for example, a whip antenna of suitable length coupled to the oscillator by a loading coil. It would be desirable to be able to transmit electromagnetic waves over at least short distances through the oscillator itself.

SUMMARY OF THE INVENTION

According to the invention, a resonant feedback oscillator is provided with a loose wound inductor in its frequency-determining tank circuit in order that the oscillator may function as a direct transmitter for relatively short ranges using the inductor as an antenna. At least one voltage-variable capacitor is connected in a circuit in parallel with the inductor to complete the frequency determining tank circuit. A thermistor connected in series with a resistor is employed as a biased network for the voltage-variable capacitor to vary its capacitance in a known manner as a function of the environmentl temperature of the thermistor.

In accordance with a further feature of the present invention, the inductor is provided as a printed circuit, preferably in a spiral form. The self-transmitting oscillator is then capable of providing sustained reliable operation under extreme conditions which may be encountered in industrial or laboratory environments, such as vibration or acceleration.

Both ruggedness and sensitivity of the self-transmitting oscillator for temperature telemetering is achieved for heat transfer studies of a particular material in a given environment in accordance with a further feature of the invention by a very thin film thermistor deposited on a relatively thin substrate of the material being investigated. To protect the thermistor, and very fine conductive wires attached to it, potting material is applied on the thermistor side of the substrate. This has the more important function of thermally insulating the thermistor except from the substrate, whereby the thermistor varies in temperature as a result of heat transfer only through the substrate. The substrate is selected to be greater in area than the thermistor to prevent edge heating of the thermistor, i. e., heating of the thermistor from the sides also, instead of just through the substate. It has been found that a substarate greater in area than the thermistor by a factor of about 10 will provide satisfactory results. Such a large area for the substrate increases its mass; accordingly, for fast heat transfer response, the substrate is made thicker than the thermistor by a factor of less than 10. Thus, owing to the larger area of the substrate and the thinness of both the substrate and the thermistor, a fast calorimetric type of sensor is provided with high-sensitivity to environmental temperature changes, such as sensitivity in the order of 0.5% change in resistance of the thermistor per degree Fahrenheit change in the environmental temperature of a nickel substrate.

The novel features that are considered characteristic of this invention are set forth with particularity in the appended claims. The invention will best be understood from the following description with reference to the accompanying drawings.

DESCRIPTION OF THE PREFERRED EMBODIMENT

Figure 1:
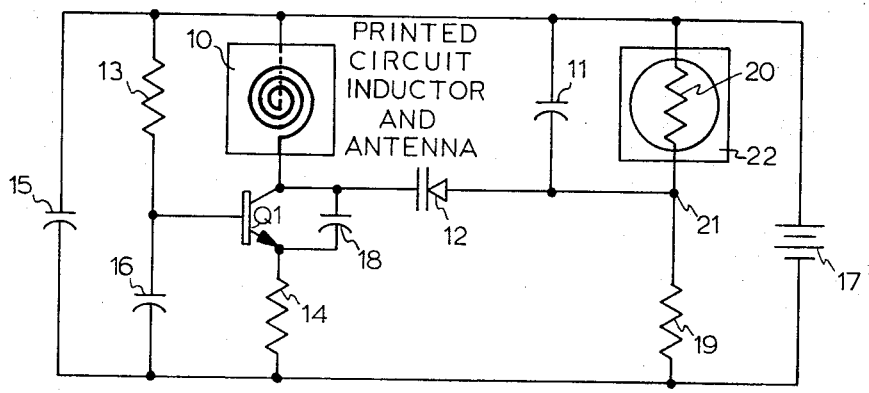
FIG. 1 is a circuit diagram of a first embodiment of the present invention.

In a first embodiment of the invention comprising a calorimetric type of sensor as shown in FIG. 1, a resonant-feedback oscillator is provided comprising a transistor $Q_1$ and and inductor 10 in the collector circuit thereof that forms a parallel resonate circuit with a fixed capacitor 11 and a voltage-variable capacitor 12. Both capacitors 11 and 12 together set the effective capacity against which the inductor 10 resonates. Resistors 13 and 14 connected to the respective base and emitter electrodes set the operating point of the transistor $Q_1$ for class C operation to secure high output and efficiency. Capacitors 15 and 16 are provided to stabilize operation by shunting AC signals from the base of the transistor $Q_1$. Thus, the capacitor 15 is connected in parallel with a power supply battery 17 while the capacitor 16 is connected in parallel with the base emitter circuit of the transistor $Q_1$ to maintain the respective power supply and base-emitter voltages constant.

Feedback from the collector of the transistor $Q_1$ is provided by a capacitor 18 which is connected directly between the collector and emitter of the transistor $Q_1$. The nominal operating frequency of the oscillator is approximately 115 mHz. with a 0.9 µh. inductor and the voltage-variable capacitor 12 suitably biased for about 14 pf. with a fixed value for the capacitor 11 of 100 pf. Bias for the voltage variable capacitor 12 is provided by a voltage dividing network comprising a resistor 19 and a thermistor 20 connected in parallel with the power supply 17. The voltage-variable capacitor 12 may be, for example, a reverse biased diode of the type well known in the art and commonly referred to as a varicap or varactor. Since the voltage developed at a junction 21 between the resistor 19 and the thermistor 20 is variable with temperature, because of the change in resistance ratio of the thermistor 20 to the resistor 19, the resonant frequency of the tank circuit for the oscillator is made variable with temperature by the variable voltage at that junction.

The nominal capacitance of an MV 1866 diode used as a voltage-variable capacitor is in the order of about 18 pf. with no reverse biasing potential. In order to operate the oscillator at a nominal operating frequency of about 115 MHz. the voltage dividing network comprising the resistor 19 and thermistor 20 is selected to provide a nominal reverse voltage of about one volt on such a diode. Accordingly, with a 4 volt power supply, for example, and a resistor 19 of 10K ohms, a thermistor is selected to provide 3.3K ohms for a nominal temperature of the environment to be monitored.

It should be noted that neither a voltage-variable capacitance diode nor a thermistor has a linear characteristic throughout its entire operable range. However, each may be selected and operated over a limited range over which its characteristic is substantially linear. For example, a commercially available voltage-variable capacitance diode MV 1866 does have a substantially linear characteristic between approximately 0.5 and 1.5 volts for a capacitance range of about 16 to 13 pf. Since the nominal capacitance of the voltage-variable capacitor 12 is smaller than the capacitor 11 by a factor of about 7 the frequency of the oscillator is controlled by the voltage at the junction 21 because the smaller capacitor in a series branch of a parallel resonant circuit has the most effect on the resonant frequency.

As the environmental temperature increases, the resistance of the thermistor 20 decreases, thereby decreasing the voltage across the circuit branch comprising the voltage-variable capacitor 12 in series with the inductor 10. A decrease in reverse voltage on the voltage-variable capacitor 12 increases its capacitance, thereby decreasing the resonant frequency of the oscillator. Thus, if temperature increases, the net effect is a decrease in frequency, and vice versa.

For heat transfer investigations, the thermistor 20 was deposited as a thin (.0004 inch) film on a relatively thin (.001 inch) substrate 22. The substrate is provided with an area approximately 10 times the area of the deposited thermistor 20, and the thermistor 20 is protected by a relatively thick coating of a material which is a thermal and electrical nonconductor, such as a suitable epoxy resin. In that manner, a change in temperature occurs in the thermistor 20 as a result of heat transfer only through the substrate 22 of a material being investigated, such as nickel. Since nickel is also a good electrical conductor, a thin film of electrical insulation is provided between the thermistor and the substrate. Such an insulating film may be provided without significantly altering the heat transfer characteristics of the substrate by, for example, anodizing the surface of the substrate.

The sensitivity of such a calorimetric type of sensor for nickel was approximately 25 kHz./° F. with a 10 percent change in the thermistor resistance producing a 2 percent change in the capacitance of the voltage-variable capacitor 12 for a full scale deviation in frequency. Such extreme sensitivity with fast heat transfer response is made possible by the very thin thermistor deposited (such as by vapor deposition techniques) on substrate that is not much thicker than the thermistor. Good results may be obtained by a substrate that is thicker by a factor of less than ten.

It should be noted that selection of the capacitor 11 and the resistance ratio of the voltage divider can easily provide a variety of desired sensitivities, but for a calorimetric sensor, a minimum desired sensitivity of about 20 kHz./° F. was selected. Operation was found to be normal over a temperature range of 30° F. to 135° F. The oscillator stability over that range of temperatures was found to be a function of only the stability of the transistor $Q_1$. Accordingly, stable operation over a wide range of temperatures may be achieved by employing standard techniques for stabilizing the operation of a junction transistor. However, for most applications, the present invention would be employed as a temperature monitor over a more limited range and would, therefore, not present any problems in stabilizing the operation of the transistor $Q_1$.

The inductor 10 is loose wound and is provided preferably as a printed circuit in the manner schematically illustrated in order that the conductive material (printed wire) may function both as a stable inductor and as an antenna for short range transmission. The printed circuit form for the inductor 10 provides stability of its inductance, and therefore of the oscillator operation, under extreme conditions such as vibration or acceleration, as may be encountered in research applications. A quarter-wave dipole or stub antenna may be employed to receive the frequency signal transmitted by the inductor 10. The receiver (not shown) may be provided with a suitable preamplifier and detector, and may be adapted to have an analog voltage output proportionate to the frequency of the signal received.

Figure 2:
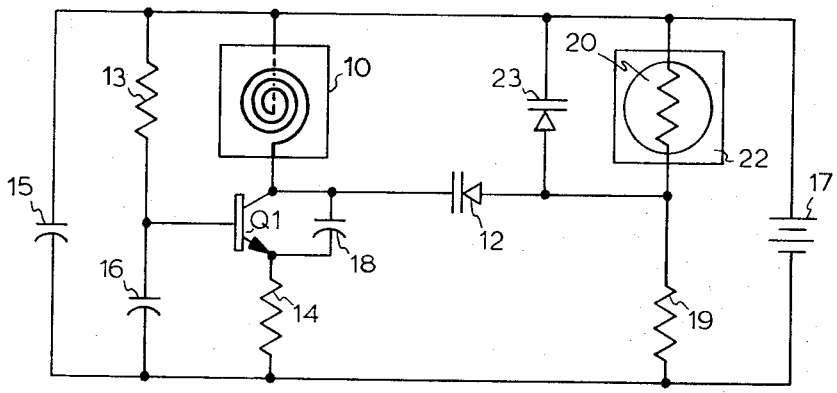
FIG. 2 is a variant of the first embodiment illustrated in FIG. 1.

Referring now to FIG. 2, a variant of the preferred embodiment of the present invention is provided by substituting for the fixed capacitor 11 in FIG. 1, a voltage-variable capacitor 23. Since all other elements remain the same as in FIG. 1, the same reference numerals are employed for them in FIG. 2. Operation of the oscillator is substantially the same as before, but owing to the variable capacitor 23 having been substituted for the fixed capacitor 11 of the FIG. 1, sensitivity is substantially increased to about 50 kHz. per degree F because while the capacitance of the voltage-variable capacitor 12 is being increased, the capacitance of the voltage-variable capacitor 23 is also being increased. Thus, the variant of FIG. 2 is capable of a greater frequency change with an equal change in temperature over the embodiment of FIG. 1. However, as noted hereinbefore, the sensitivity of the embodiment illustrated in FIG. 1 may also be increased by proper selection of parameters relating to the voltage-variable capacitor 12 and the voltage dividing network connected thereto. Sensitivity was increased to approximately 110 kHz./° F. in that manner. Such increased sensitivity will provide a greater frequency change for a given temperature change and an improved signal to noise ratio.

Figure 3:
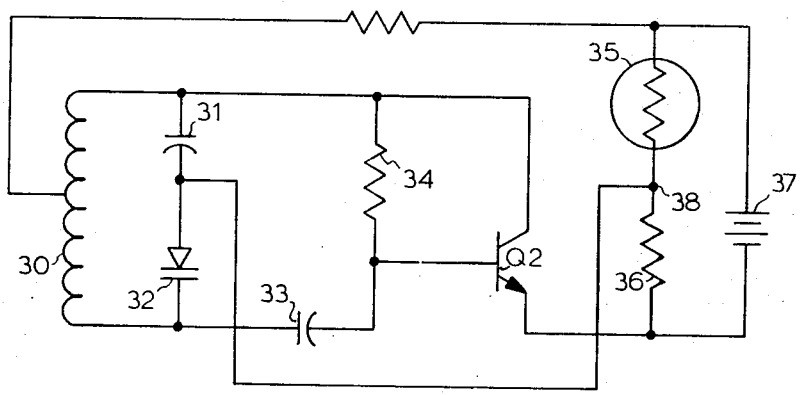
FIG. 3 is a circuit diagram of a second embodiment of the present invention.

Another embodiment of the present invention illustrated in FIG. 3 comprises a shunt-fed resonant feedback oscillator. The resonant circuit, comprising an inductor 30 in parallel with a fixed capacitor 31 in series with a voltage-variable capacitor 32, is coupled to the base of a transistor $Q_2$ by a DC blocking capacitor 33. A resistor 34 connected to the base of the transistor $Q_2$ establishes the operating point thereof. A voltage dividing network comprising a thermistor 35 and resistor 36 is connected in parallel with the power supply battery 37. A junction 38 between the thermistor 35 and the resistor 36 is connected to the junction between the capacitor 31 and voltage-variable capacitor 32 in order to provide a bias voltage for the voltage-variable capacitor 32 which varies as a function of the temperature of the thermistor 35. Thus, oscillations of the tank circuit, which vary in frequency as a function of temperature, are fed back through the capacitor 33 to sustain oscillations.

The operation and function of the voltage-variable capacitor 32 and the voltage dividing network comprising thermistor 35 and resistor 36 remain the same as in the embodiment of FIG. 1. Accordingly, it should be recognized that the principle of the invention more fully described with reference to FIG. 1 may be applied to any resonant-feedback oscillator in which a voltage-variable capacitor may be so connected in series with another capacitor in the resonant circuit thereof that a bias voltage may be applied to it to vary its capacitance. If the circuit permits, as in the embodiments of FIGS. 1 and 3, a second voltage-variable capacitor may be substituted for the fixed capacitor in the manner illustrated in FIG. 2 for the embodiment of FIG. 1. Such a substitution may be made in a directly analogous manner in the circuit of FIG. 3 by substituting for the fixed capacitor 31 a voltage-variable capacitor.

The inductor 30 may be loose wound, preferably in a printed circuit form, as in the embodiment of FIG. 1, in order that it may better function as an antenna for short range transmission.

Although particular embodiments of the invention have been described and illustrated, it is recognized that modifications and variations may readily occur to those skilled in the art. Consequently, it is not intended that the scope of the invention be limited to the disclosed exemplary embodiments, but rather only to the principles illustrated by the embodiments.

What is claimed is:
1. A temperature telemetric transmitter comprising:
a resonant-feedback oscillator having in its resonant circuit a loose wound inductor in parallel with two series connected capacitors, whereby said oscillator itself transmits electromagnetic waves from said inductor, at least one of said series connected capacitors being voltage-variable;
a voltage source;
a voltage dividing network connected in parallel with said voltage source, said network comprising first and second resistors connected in series, one of said first and second resistors being a thermistor; and
means connecting a junction between said first and second resistors to a junction between said series connected capacitors for direct current conduction between said junctions, whereby the frequency of said electromagnetic wave varies in a known manner with variations in temperature of said thermistor.

2. Apparatus as defined in claim 1 wherein said thermistor is a thin film supported by a thin substrate thicker than said thermistor.

3. Apparatus as defined in claim 2 wherein said thermistor is thermally insulated except from said substrate, whereby said thermistor varies in temperature as a result of heat transfer only through said substrate.

4. In a resonant-feedback oscillator, a resonant circuit comprising:
a first capacitor in series with a second capacitor, at least one of said first and second capacitors being voltage-variable;
an inductor in parallel with said series connected first and second capacitors;
a voltage source;
a voltage dividing network connected in parallel with said voltage source, said network comprising first and second resistors connected in series, one of said first and second resistors being a thermistor; and
means connecting a junction between said first and second resistors to a junction between said first and second capacitors for direct current conduction between said junctions, whereby the frequency of said oscillator varies in a known manner with variations in temperature of said thermistor.

5. Apparatus as defined in claim 4 wherein said thermistor is deposited on a substrate as a very thin film and is thermally insulated except from said substrate, whereby the frequency of said oscillator changes at a rate proportionate to the rate heat is transferred to said thermistor through said substrate.

6. Apparatus as defined in claim 5 wherein said substrate is greater in area than said thermistor to prevent edge heating of said thermistor.

7. Apparatus as defined in claim 6 wherein said substrate is greater in area than said thermistor by a factor of about 10.

8. Apparatus as defined in claim 5 wherein said substrate is thicker than said very thin film thermistor by a given factor, said factor being selected to provide fast heat transfer response to very small differences in temperature between said thermistor and the environment of said substrate.

9. Apparatus as defined in claim 8 wherein said thermistor is about 0.001 inch thick, and said substrate is thicker by a factor of less than 10.

References Cited

UNITED STATES PATENTS

| | | | |
|---|---|---|---|
| 2,818,732 | 1/1958 | Bennett | 325—113 |
| 3,158,027 | 11/1964 | Kibler | 325—113 |
| 3,231,834 | 1/1966 | Watanabe | 325—113 |
| 3,297,021 | 1/1967 | Davis et al. | 325—113 |

ROBERT L. GRIFFIN, Primary Examiner

A. J. MAYER, Assistant Examiner

U.S. Cl. X.R.

331—36, 66, 117, 180; 340—201, 227, 228